(12) United States Patent
Yu et al.

(10) Patent No.: US 10,739,652 B2
(45) Date of Patent: Aug. 11, 2020

(54) DISPLAY PANEL

(71) Applicant: InnoLux Corporation, Miao-Li County (TW)

(72) Inventors: Yi-Ling Yu, Miao-Li County (TW); Chun-Liang Lin, Miao-Li County (TW); Chia-Hao Tsai, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 15/376,724

(22) Filed: Dec. 13, 2016

(65) Prior Publication Data

US 2017/0168362 A1   Jun. 15, 2017

(30) Foreign Application Priority Data

Dec. 14, 2015  (TW) .............................. 104141881 A

(51) Int. Cl.
*G02F 1/1362* (2006.01)
*G02F 1/136* (2006.01)

(52) U.S. Cl.
CPC .. *G02F 1/136286* (2013.01); *G02F 1/136227* (2013.01); *G02F 2001/13606* (2013.01)

(58) Field of Classification Search
CPC ......... G02F 1/136286; G02F 1/136227; G02F 2001/13606; G02F 1/13439; G02F 1/133345; G02F 1/136213; G02F 2001/134354; G02F 1/1343; G02F 1/134309; G02F 1/155; G02F 1/1393; G02F 1/1395; G02F 1/136; G02F 1/218; G02F 1/134363; G02F 1/134327; G02F 2001/134318; G02F 2001/134372; G02F 2001/134381; G02F 2001/134345; G02F 2001/1357; G02F 2001/136218; G02F 2001/136295; G02F 2001/1552;
(Continued)

(56) References Cited

U.S. PATENT DOCUMENTS

2003/0086045 A1\* 5/2003 Ono ................... G02F 1/134309
349/141
2005/0036091 A1\* 2/2005 Song ................. G02F 1/133707
349/129
(Continued)

FOREIGN PATENT DOCUMENTS

CN          1601362 A      3/2005
CN        103123429 A      5/2013
(Continued)

*Primary Examiner* — Shan Liu
(74) *Attorney, Agent, or Firm* — Bacon & Thomas, PLLC

(57) ABSTRACT

A display panel is disclosed, which includes: a substrate including a display region and a border region; plural scan lines disposed on the display region; plural data lines disposed on the display region, crossing with the scan lines to define plural pixel units and including adjacent first and second data lines; a first common line disposed on the display region and crossing with the data lines; and a first common pad disposed in one of the pixel units on the display region, electrically connecting to the first common line, and disposed between the first and second data line, wherein first and second minimum distances between the first common pad and the first and second data lines are different.

15 Claims, 8 Drawing Sheets

(58) Field of Classification Search
CPC ..... G02F 2001/1555; G02F 2001/1557; G02F 2001/13629; G02F 2201/12; G02F 2201/121; G02F 2201/124; G02F 2201/122; G02F 2201/123; G02F 2201/14; G02F 1/1362; G02F 1/136209; G02F 1/1365; G02F 1/1368; G02F 2001/136222; G02F 2001/136231; G02F 2001/13625; G02F 2001/1635; G02F 2001/122; G02F 2202/10; G02F 1/0121; G02F 1/0327; G02F 1/076; G02F 1/133; G02F 1/13306; G02F 1/1345; G02F 1/13452; G02F 1/13454; G02F 1/13458; G02F 2001/133388; G02F 2001/133612; G02F 1/133707; G02F 1/134336; G02F 1/0316; G02F 1/136222; G02F 1/13625; G02F 1/1635; G02F 2001/13456; H01L 27/1255; H01L 27/3265; H01L 27/124; H01L 27/3276; H01L 27/3297; H01L 27/3279; H01L 27/329; H01L 2933/0016; H01L 2021/775; H01L 27/1214; H01L 27/2436; H01L 29/66068; H01L 29/66227; H01L 29/72; H01L 29/786; H01L 2924/1304; H01L 51/0504; H01L 51/0508; H01L 23/48; H01L 23/49572; H01L 2224/50; H01L 2224/79; H01L 2224/86; H01L 2225/06579; H01L 2225/107; H01L 27/0426; H01L 27/0439; H01L 24/50; H01L 23/49534; H01L 29/66037; G09G 2300/0876; G09G 2300/0421; G09G 2300/0426; G09G 2300/0439; G09G 3/3659; G09G 2300/0408; G09G 3/3655; G09G 3/3674; G09G 3/3685; G09G 2290/00; G09G 2320/0223; G09G 3/36

USPC ......... 349/38, 39, 139–148, 42–43, 149–152

See application file for complete search history.

(56) References Cited

U.S. PATENT DOCUMENTS

| | | | | |
|---|---|---|---|---|
| 2005/0062898 | A1* | 3/2005 | Imayama | G02F 1/133345 349/43 |
| 2007/0171319 | A1* | 7/2007 | Fujita | G02F 1/134309 349/43 |
| 2007/0222907 | A1* | 9/2007 | Onogi | G02F 1/134363 349/42 |
| 2011/0050551 | A1* | 3/2011 | Ota | G02F 1/134363 345/87 |
| 2012/0249914 | A1* | 10/2012 | Jung | H01L 27/124 349/43 |
| 2013/0194521 | A1* | 8/2013 | Whangbo | G02B 27/2214 349/15 |
| 2016/0054625 | A1* | 2/2016 | Hsia | G02F 1/136227 349/43 |
| 2016/0202580 | A1* | 7/2016 | Hong | G02F 1/136227 257/72 |
| 2017/0371467 | A1* | 12/2017 | Kurasawa | G09G 3/2092 |

FOREIGN PATENT DOCUMENTS

| | | |
|---|---|---|
| CN | 104280966 A | 1/2015 |
| TW | I242671 B | 11/2005 |
| TW | I364553 B | 5/2012 |
| TW | 201235758 A | 9/2012 |

* cited by examiner

DISPLAY PANEL

CROSS REFERENCE TO RELATED APPLICATION

This application claims the benefits of the Taiwan Patent Application Serial Number 104141881, filed on Dec. 14, 2015, the subject matter of which is incorporated herein by reference.

BACKGROUND

1. Field of the Disclosure

The present disclosure relates to a display panel, and more particularly, to a display panel having a first common pad being disposed in display region.

2. Description of Related Art

As display technology advances, all display devices are now being developed toward having smaller volume, thinner thickness, and lighter weight. Hence, conventional cathode ray tube (CRT) display has been replaced gradually by thin displays, such as liquid crystal display (LCD) panels, organic light emitting diode (OLED) display panels, or inorganic light emitting diode display displays. Thin displays are applied in various fields. For example, display devices used in daily life, such as mobile phones, laptop computers, video cameras, cameras, music players, mobile navigation devices, and televisions, are equipped with the aforesaid display panels.

Although LCD display panels and OLED display panels are already commercially available and the technology of LCD display panels is quite mature. However, manufacturers are still aiming to develop display panels with improved display quality in order to meet customer's demand for higher display quality. The design of elements and the way the elements is disposed in the display region of display panels are some of the factors influencing the overall performance of display panels.

Accordingly, to further improve the display quality of display panels, there is still a need to improve the design of elements and the way the elements is disposed in the display region of display panels.

SUMMARY

The object of the present disclosure is to provide a display panel, wherein the disposition of the first common pad in the display region is designed to prevent the issue of unexpected large parasitic capacitance arose between the data line and the first transparent conductive layer above the data line.

The display panel of the present disclosure comprises: a substrate comprising a display region and a border region; plural scan lines disposed on the display region; plural data lines disposed on the display region, wherein the data lines cross the scan lines to define plural pixel units, the data lines comprises a first data line and a second data line, and the first data line and the second data line are adjacent; a first common line disposed on the display region, wherein the first common line crosses the data lines; and a first common pad disposed in one of the pixel units on the display region, wherein the first common pad electrically connects to the first common line, and the first common pad is disposed between the first data line and the second data line; wherein a first minimum distance is between the first common pad and the first data line, a second minimum distance is between the first common pad and the second data line, and the first minimum distance and a second minimum distance are different.

In the display panel of the present disclosure, the first common line comprises part of a first metal layer, and the first common pad comprises part of a second metal layer, wherein a first insulating layer is disposed between the first metal layer and the second metal layer, the first insulating layer comprises a first contact via, the second metal layer contacts with the first metal layer through the first contact via. In addition, a second insulating layer is disposed on the second metal layer; the second insulating layer comprises a second contact via, the second metal layer contacts with a first transparent conductive layer through the second contact via, wherein the second contact via partially overlaps with the first contact via. Furthermore, the display panel of the present disclosure may further comprises a third insulating layer and a second transparent conductive layer, wherein the third insulating layer is disposed on the second insulating layer, and the third insulating layer comprises a third contact via, one of the first transparent conductive layer and the second transparent conductive layer is disposed between the third insulating layer and the second insulating layer and the other of the first transparent conductive layer and the second transparent conductive layer is disposed on the third insulating layer, and the first transparent conductive layer contacts with the second transparent conductive layer through the third contact via, wherein the third contact via does not overlap with the first contact via and the second contact via.

In the display panel of the present disclosure, the first minimum distance between the first common pad and the first data line and the second minimum distance between the first common pad and the second data line are designed to be different to prevent the issue of unexpected large parasitic capacitance arose between the data line and the first transparent conductive layer above the data line. More specifically, a first common pad is disposed in a pixel unit of the display panel; when it is desired to transmit a common signal from the first metal layer to the second transparent conductive layer, the signal can be first transmitted from the first metal layer to the second metal layer by contact between them through the first contact via. Then, the signal can be transmitted from the second metal layer to the first transparent conductive layer by direct contact between them through the second contact via. Next, the signal can be transmitted from the first transparent conductive layer to the second transparent conductive layer by direct contact between them through the third contact via. Therefore, in a pixel unit, in addition to the first contact via which is corresponding to the first common pad, it is necessary to dispose a third contact via which can electrically connect the first transparent conductive layer with the second transparent conductive layer. When the first and second minimum distances between the first common pad and the first and second data lines are designed to be the same, the third contact via is closer to the data line; although there is an insulating layer separates the data line and the transparent conductive layer, the side wall of the contact via of the insulating layer is a declined side wall. When the third contact via is closer to the data line, the declined side wall may be located above the data line. And the insulating layer at the place of the sloped side wall used to separate the metal layer and the transparent conductive layer has a smaller thickness. Thus the insulation of the insulating layer between the first transparent conductive layer (and the second transparent conductive layer) and the data line is poor and the issue of unexpected large parasitic capacitance may occur. Therefore, in the display panel of the present disclosure, the first and second minimum distances between the first common pad and the first and second data lines are designed to be different. The third contact via is farther from the data line to prevent the issue of poor insulation of the insulating layer between the first transparent conductive layer (and the second transparent conductive layer) and the data line. And the parasitic capacitance arose between the first transparent conductive layer (and the second transparent conductive layer) and the data line is further reduced.

In the display panel of the present disclosure, in the cross-sectional views or the top views, the edge of the second contact via exceeds the edge of the first metal layer; in other words, the edge of the second contact via locates outside of the first metal layer; in other words, the edge of the first metal layer overlaps the second contact via.

In addition, the display panel of the present disclosure further comprises a second common pad, a third common pad, a second common line and a third common line, wherein the second common line and the third common line are disposed on the display region, the second common line and the third common line cross the data lines, the second common pad and the third common pad are disposed on the display region, and the second common pad and the third common pad electrically connect to the second common line and the third common line respectively; wherein the second common pad is between the first common pad and the third common pad, a first distance is between the first common pad and the second common pad, a second distance is between the second common pad and the third common pad, and the first distance is different from the second distance.

In the display panel of the present disclosure, the first common line comprises a protrusion locating at intersections of the first common line and the data lines and the protrusion protrudes toward a lengthwise direction of the data lines.

In addition, in the display panel of the present disclosure, an angle between the first metal layer and the second metal layer is larger than 0° and smaller than 45° at the place of the first contact via.

Furthermore, in the display panel of the present disclosure, the first common pad comprises a first edge and a second edge, and the first edge opposites to the second edge, the first data line is relatively close the first edge and the second data line is relatively close to the second edge; wherein the first minimum distance is between the first data line and the first edge and the second minimum distance is between the second data line and the second edge along an extension direction of the scan lines. In one embodiment, when the width of the pixel unit along an extension direction of the scan lines is 300~320 μm, a difference between the first minimum distance and the second minimum distance is 1.5~299 μm; in one embodiment, when the width of the pixel unit along an extension direction of the scan lines is 200~220 μm, a difference between the first minimum distance and the second minimum distance is 1.5 to 196.17 μm; in one embodiment, when the width of the pixel unit along an extension direction of the scan lines is 145~165 μm, a difference between the first minimum distance and the second minimum distance is 1.5 to 144.75 μm; in one embodiment, when the width of the pixel unit along an extension direction of the scan lines is 100~120 μm, a difference between the first minimum distance and the second minimum distance is 1.5 to 93.33 μm. The first common pad further comprises a third edge, and two ends of the third edge intersect with the first edge and the second edge respectively; wherein the third edge is substantially parallel to an extension direction of the scan lines.

Other objects, advantages, and novel features of the invention will become more apparent from the following detailed description when taken in conjunction with the accompanying drawings.

DETAILED DESCRIPTION OF THE EMBODIMENT

The present disclosure has been described in an illustrative manner. It is to be understood that the terminologies used are intended to be in the nature of description rather than of limitation. Many modifications and variations of the present disclosure are possible in light of the above teachings. Therefore, it is to be understood that within the scope of the appended claims, the disclosure may be practiced otherwise than as specifically described.

Hereinafter, terms such as "first" and "second" in the specification and claims are only intended to make clear distinction of elements with the same name. These terms do not mean these elements are used or manufactured in any sequence.

Figure 1:
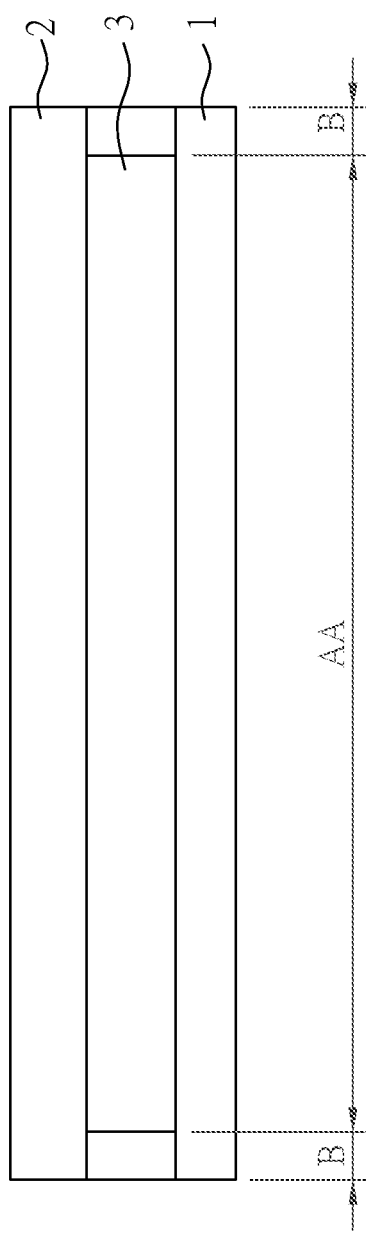
FIG. 1 is a cross-sectional view of a display panel according to one embodiment of the present disclosure.

FIG. 1 is a cross-sectional view of a display panel according to one embodiment of the present disclosure. The display panel of the present embodiment comprises: a substrate 1 includes a display region AA and a border region B surrounding the display region AA; a counter substrate 2 opposite to the substrate 1; and a display layer 3 disposed between the counter substrate 2 and the substrate 1. In the present embodiment, the substrate 1 can be a substrate with thin film transistor units disposed thereon (not shown in the figure), which is also called a thin film transistor substrate. The counter substrate 2 can be a substrate with a color filter layer disposed thereon (not shown in the figure), which is a color filter substrate. However, in other embodiments of the present disclosure, the color filter layer (not shown in the figure) can also be disposed on the substrate 1. In this case, the substrate 1 is a thin film transistor substrate integrated with a color filter array (color filter on array, COA). In addition, the display layer 3 of the display panel of the present embodiment can be a layer of liquid crystals, a layer of organic light emitting diodes, or a layer of inorganic light emitting diodes. When the display layer 3 of the display panel of the present embodiment is a layer of liquid crystals, the display panel of the present embodiment further comprises a back light module disposed under the substrate 1. Next, the structural features of units disposed on the display region AA of the substrate 1 are described in detail.

Figure 2:
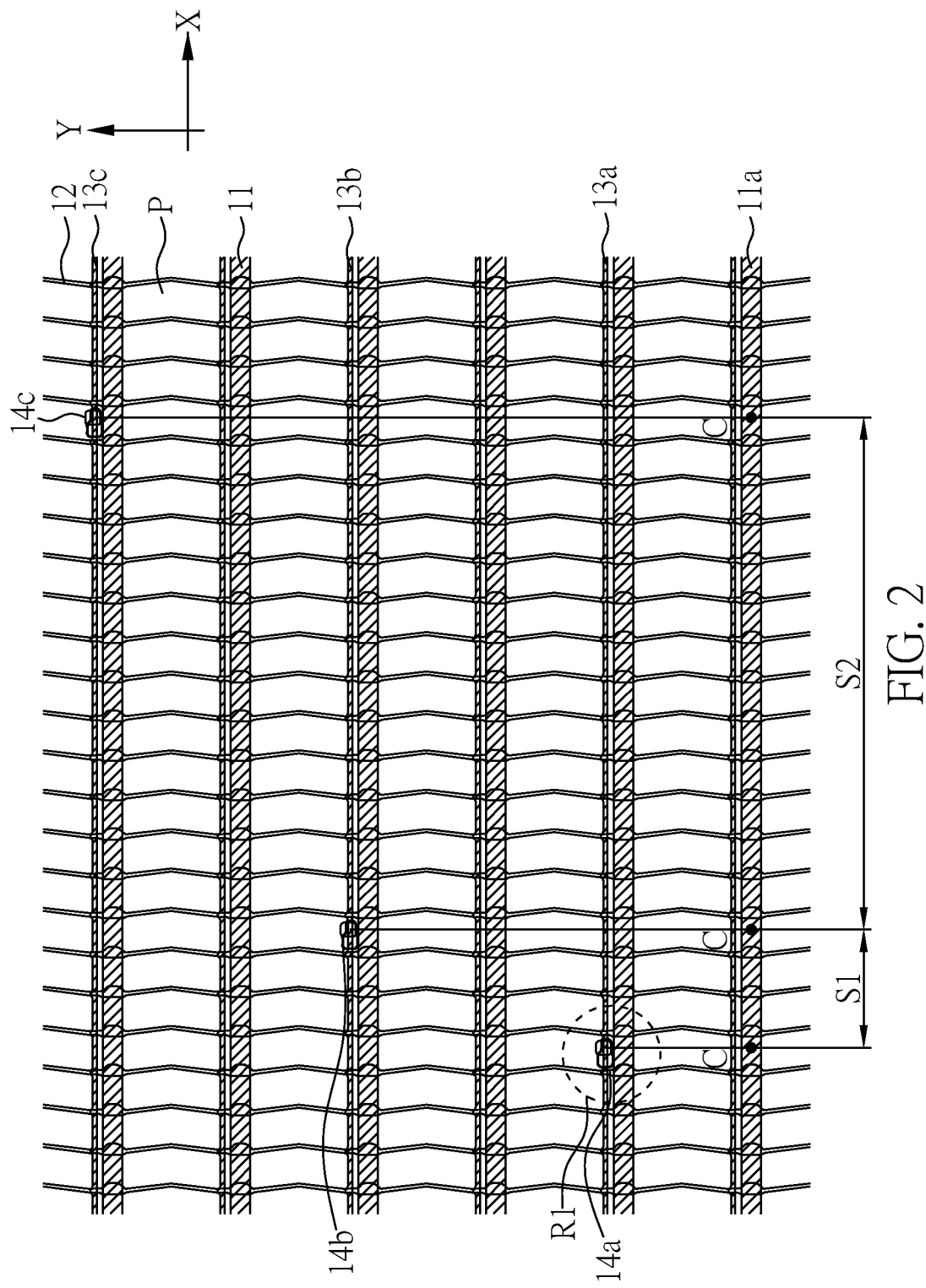
FIG. 2 is a top view of a display region of a thin film transistor substrate of a display panel according to one embodiment of the present disclosure.

FIG. 2 is a top view of a display region of a thin film transistor substrate of a display panel according to one embodiment of the present disclosure. As shown in FIG. 1 and FIG. 2, the display panel of the present embodiment further includes: plural scan lines 11 disposed on the display region AA; plural data lines 12 disposed on the display region AA and crossing the scan lines 11 to define plural pixel units P; at least one first common line 13a disposed on the display region AA and crossing the data lines 12; and a first common pad 14a disposed in one of the pixel units P on the display region AA, electrically connecting to the first common line 13a. The first common pad 14a disposes between two adjacent data lines 12 of the said data lines 12. Accordingly, signals from the first common line 13a can be transmitted by the first common pad 14a to, for example, a transparent conductive layer connected to the first common pad 14a. The disposition and operations of the first common pad 14a are described in details below.

Figure 3A:
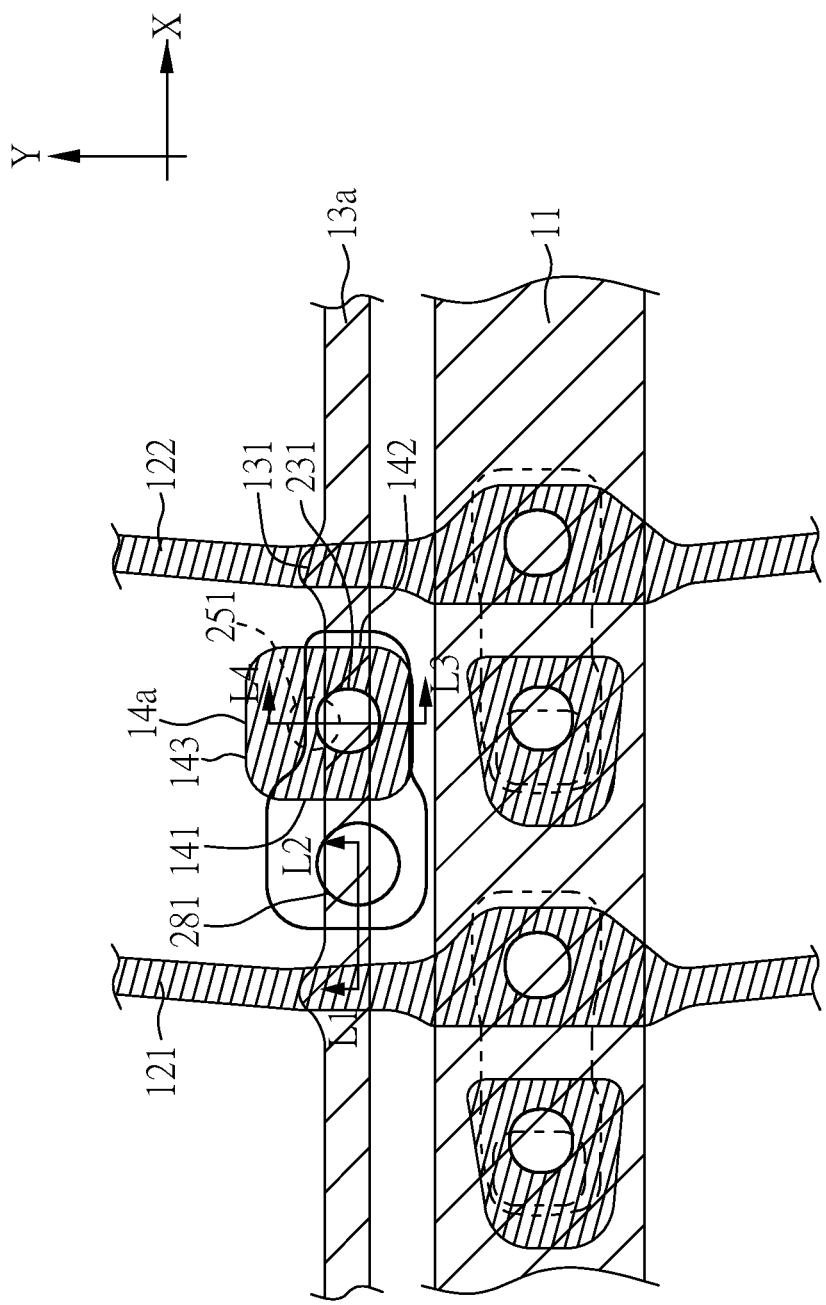
FIGS. 3A and 3B are magnified views of a portion of a thin film transistor substrate of a display panel according to one embodiment of the present disclosure.
Figure 3B:
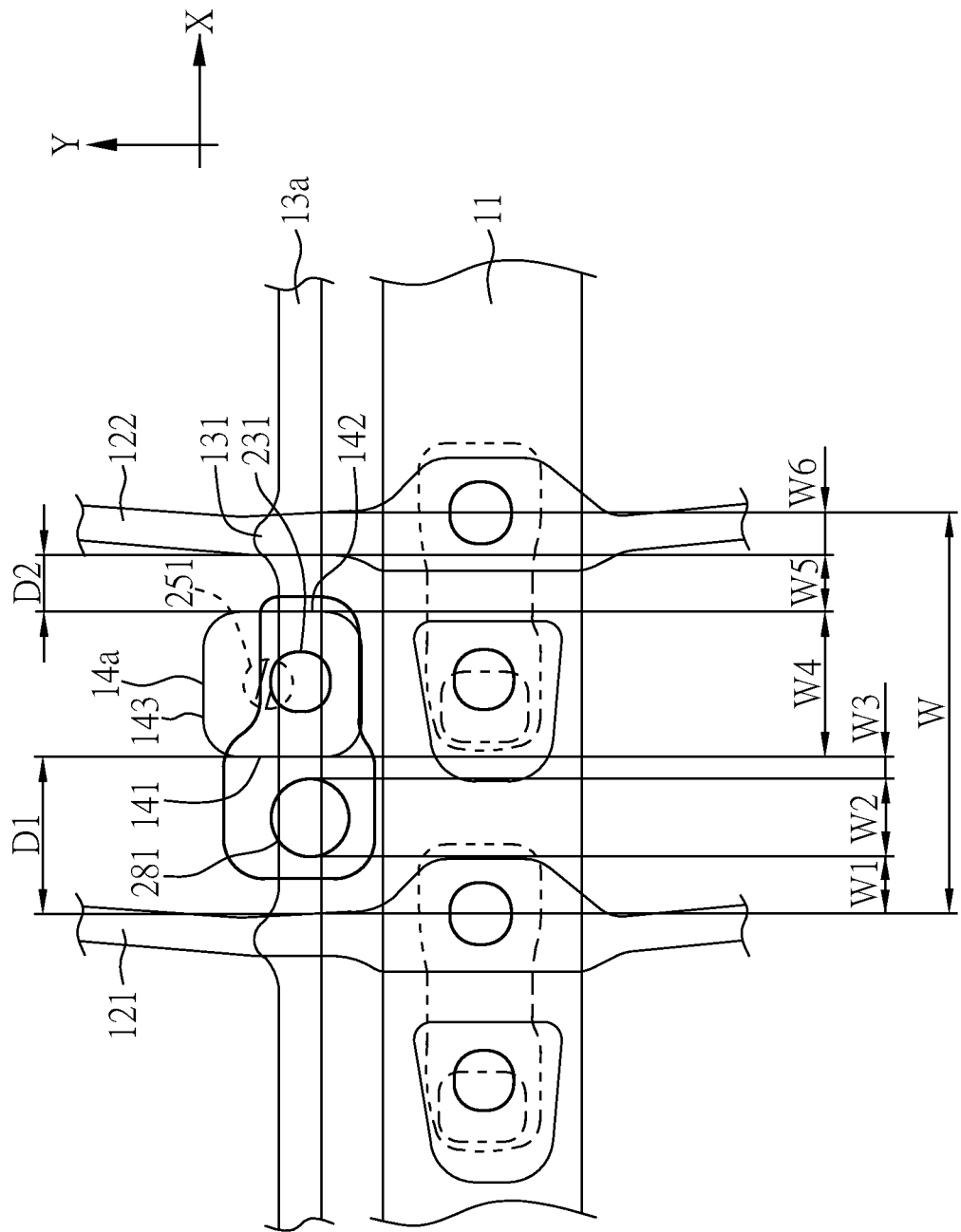
Figure 4:
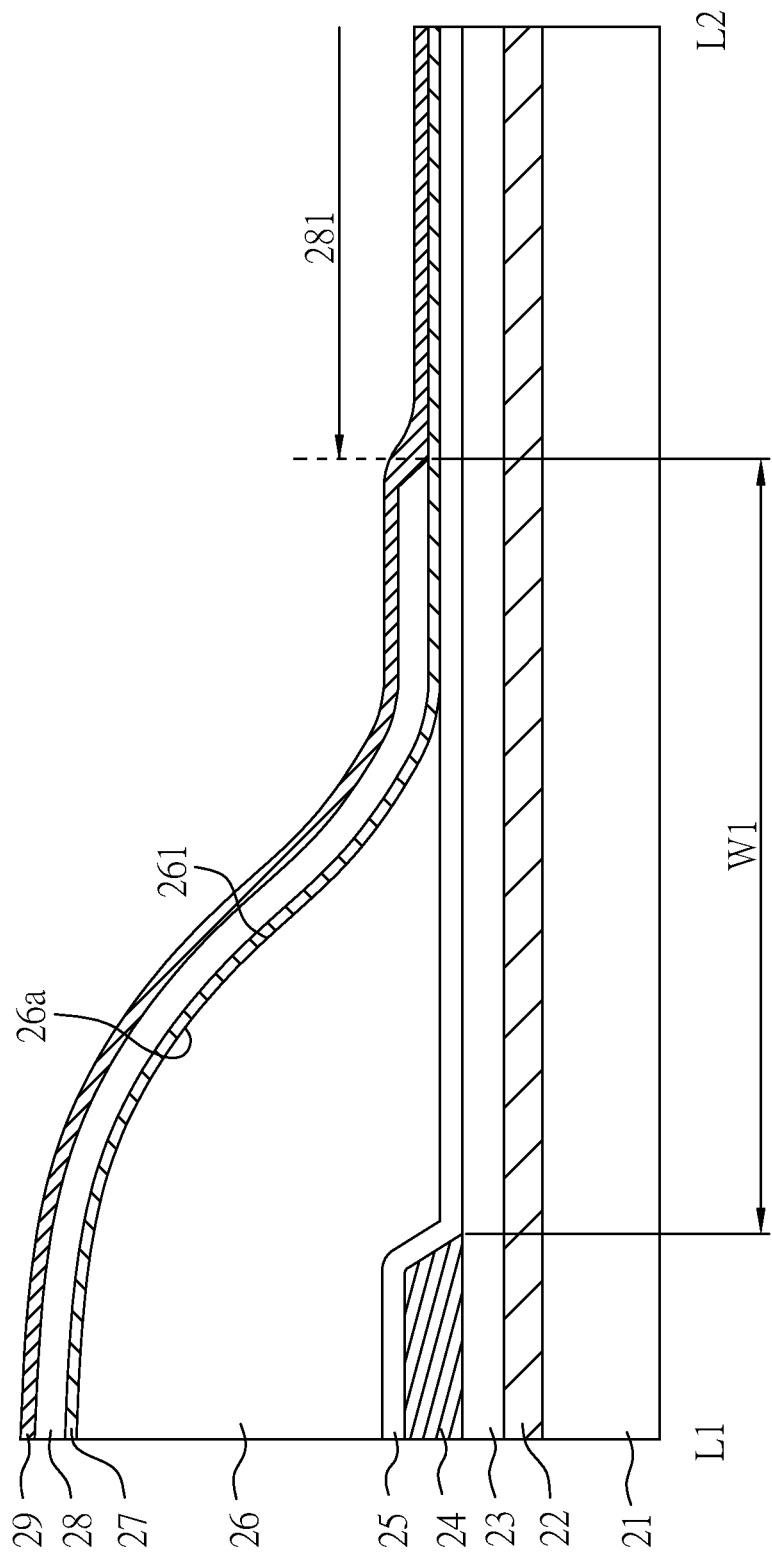
FIG. 4 and FIG. 5 are cross-sectional views of a portion of a thin film transistor substrate of a display panel according to one embodiment of the present disclosure.
Figure 5:
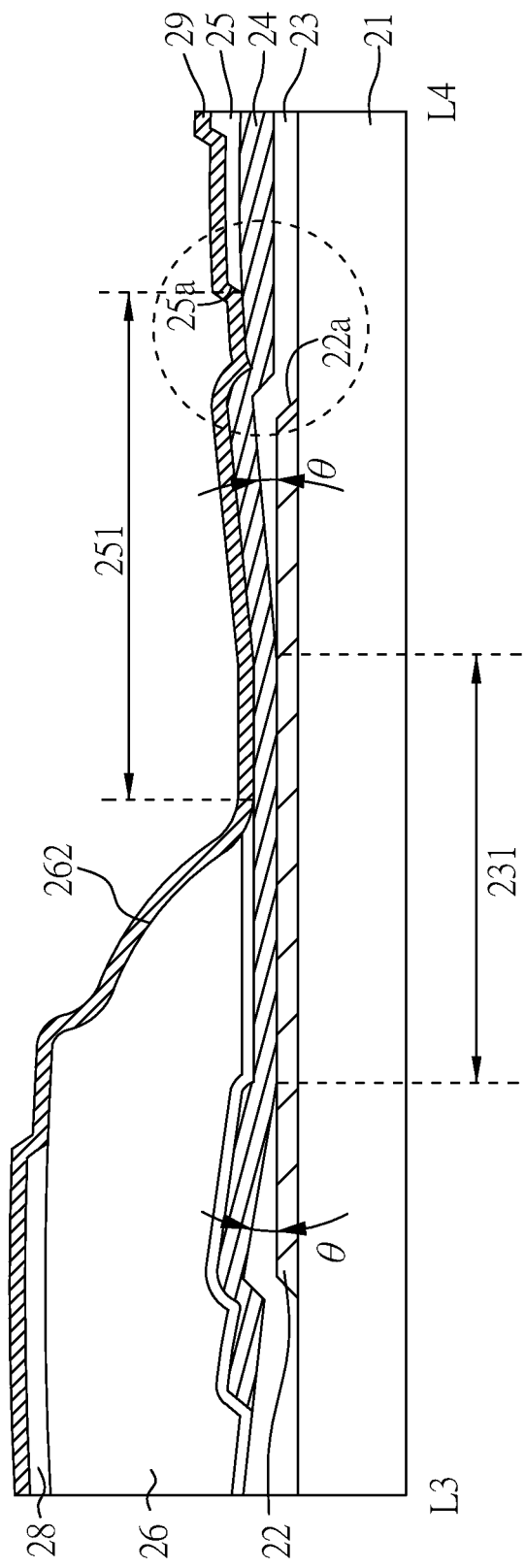

FIG. 3A and FIG. 3B are magnified views of the region R1 in FIG. 2. FIG. 3A and FIG. 3B are the same view except that FIG. 3B does not display fill lines displayed in FIG. 3A for the sake of clarity; FIG. 4 is a cross-sectional view along the line L1-L2 in FIG. 3A; FIG. 5 is a cross-sectional view along the line L3-L4 in FIG. 3A. However, for showing the relative positions of various layers on the substrate in details, only part of vias is shown in FIGS. 4 to 7. As shown in FIG. 3A to FIG. 5, in the display panel of the present disclosure, a first metal layer 22 is formed on the substrate 21, wherein the first metal layer 22 is patterned in manufacturing processes such as photolithography and etching to form the scan line 11 and the first common line 13a. A first insulating layer 23 is formed on the first metal layer 22, and the first insulating layer 23 comprises a first contact via 231 to expose a portion of the first metal layer 22 (ex: the first common line 13a). Then, a second metal layer 24 is formed on the first insulating layer 23, wherein the second metal layer 24 is patterned in manufacturing processes such as photolithography and etching to form the data line 12 (as shown in FIG. 2) and the first common pad 14a. The data line 12 includes the first data line 121 and the second data line 122, and the first data line 121 and the second data line 122 are adjacent. A second insulating layer 25 is formed on the second metal layer 24, and the second insulating layer 25 comprises a second contact via 251. An insulating layer 26 is formed on the second insulating layer 25, and the insulating layer 26 comprises contact vias 261, 262 and a sidewall 26a of the contact via. (for showing the relative positions of various layers on the substrate in details, only part of vias is shown in FIG. 4, and FIG. 5) Subsequently, a transparent conductive layer 27 (i.e. the second transparent conductive layer) is formed on the insulating layer 26. A third insulating layer 28 is formed on the transparent conductive layer 27 (i.e. the second transparent conductive layer). The third insulating layer 28 comprises a third contact via 281. Then a transparent conductive layer 29 (i.e. the first transparent conductive layer) is formed on the third insulating layer 28.

In the present embodiment, the substrate 21 can comprise substrate materials, such as glass, plastic, or flexible materials; but the present disclosure is not limited thereto. The first insulating layer 23, the second insulating layer 25, the third insulating layer 28 and the insulating layer 26 can comprise insulating materials, such as oxides (e.g. silicon oxide, or aluminum oxide), nitrides (e.g. silicon nitride), or oxynitrides (e.g. silicon oxynitride); but the present disclosure is not limited thereto. The first metal layer 22 and the second metal layer 24 can comprise conducting materials, such as metal, alloy, metal oxide, metal oxynitride, or other electrode materials; but the present disclosure is not limited thereto. The transparent conductive layer 29 (i.e. the first transparent conductive layer) and the transparent conductive layer 27 (i.e. the second transparent conductive layer) can comprise ITO, IZO, ITZO, or other transparent conducting materials; but the present disclosure is not limited thereto. However, in other embodiments of the present disclosure, the materials of the aforesaid units are not limited thereto.

As shown in FIG. 4, in the display panel of the present embodiment, the third insulating layer 28 is disposed on the second insulating layer 25 and comprises a third contact via 281, the transparent conductive layer 27 (i.e. the second transparent conductive layer) is disposed between the third insulating layer 28 and the second insulating layer 25, the transparent conductive layer 29 (i.e. the first transparent conductive layer) is disposed on the third insulating layer 28, and the transparent conductive layer 29 (i.e. the first transparent conductive layer) contacts with the transparent conductive layer 27 (i.e. the second transparent conductive layer) through the third contact via 281.

Additionally, as shown in FIG. 3A and FIG. 5, in the display panel of the present embodiment, the first common line 13a is formed from the first metal layer 22, and the first common pad 14a is formed from the second metal layer 24, wherein the first insulating layer 23 is disposed between the first metal layer 22 and the second metal layer 24, and comprises a first contact via 231. The second metal layer 24 contacts with the first metal layer 22 through the first contact via 231. In other words, the first common pad 14a electrically connects to the first common line 13 through the first contact via 231. In addition, the second insulating layer 25 is disposed on the second metal layer 24 and comprises the second contact via 251. And the second metal layer 24 contacts with the transparent conductive layer 29 (i.e. the first transparent conductive layer) through the second contact via 251. In other words, the first common line 13a electrically connects to the transparent conductive layer 29 (i.e. the first transparent conductive layer) through the first common pad 14a. Moreover, the transparent conductive layer 27 (i.e. the second transparent conductive layer) displayed here in FIG. 4 is not formed at the place where the first common pad 14a is formed.

In addition, in the display panel of the present embodiment, as shown in FIG. 3A and FIG. 3B, the first common pad 14a comprises a first edge 141 and a second edge 142. The first edge 141 opposites to the second edge 142, and the first common pad 14a is between the first data line 121 and the second data line 122. The first data line 121 is adjacent to and relatively close to the first edge 141 and the second data line 122 is adjacent to and relatively close to the second edge 142. Furthermore, the first common pad 14a further comprises a third edge 143, and two ends of the third edge 143 intersect with the first edge 141 and the second edge 142 respectively. The third edge 143 is substantially parallel to an extension direction X of the scan lines 11. A first minimum distance D1 is between the first data line 121 and the first edge 141 and a second minimum distance D2 is between the second data line 122 and the second edge 142 along an extension direction X of the scan lines 11.

As shown in FIG. 3A to FIG. 5, when it is desired to transmit a common signal from the first common line 13a (the first metal layer 22 in FIG. 5) to the transparent conductive layer 27 (i.e. the second transparent conductive layer), the first common pad 14a (the second metal layer 24 in FIG. 5) first contacts with and electrically connects to the first metal layer 22 through the first contact via 231 so that the common signal can be transmitted from the first metal layer 22 to the first common pad 14a (the second metal layer 24 in FIG. 5). Then, the first common pad 14a (the second metal layer 24 in FIG. 5) contacts with and electrically connects to the transparent conductive layer 29 (i.e. the first transparent conductive layer) through the second contact via 251 so that the common signal which is transmitted to the second metal layer 24 is further transmitted to the transparent conductive layer 29 (i.e. the first transparent conductive layer). Moreover, the transparent conductive layer 29 (i.e. the first transparent conductive layer) contacts with and electrically connects to the transparent conductive layer 27 (i.e. the second transparent conductive layer) through the third contact via 281 so that the common signal which is transmitted to the transparent conductive layer 29 (i.e. the first transparent conductive layer) is further transmitted to the transparent conductive layer 27 (i.e. the second transparent conductive layer).

In the present embodiment, the transparent conductive layer 27 (i.e. the second transparent conductive layer) functions as common electrode layer, and the transparent conductive layer 29 (i.e. the first transparent conductive layer) functions as pixel electrode layer. In addition, in the present embodiment, it discloses that the transparent conductive layer 27 (i.e. the second transparent conductive layer) is disposed between the third insulating layer 28 and the second insulating layer 25, and the transparent conductive layer 29 (i.e. the first transparent conductive layer) is disposed on the third insulating layer 28. However, in other embodiments of the present disclosure, the relative arrangement of the place where the transparent conductive layer 29 (i.e. the first transparent conductive layer) disposed and that of the transparent conductive layer 27 (i.e. the second transparent conductive layer) is not limited to what has been shown in FIG. 4, as long as the transparent conductive layer 29 (i.e. the first transparent conductive layer), the transparent conductive layer 27 (i.e. the second transparent conductive layer), the first metal layer 22 and the second metal layer 24 are electrically connected with each other in the way as previously described. It can be that one of the transparent conductive layer 29 (i.e. the first transparent conductive layer) and the transparent conductive layer 27 (i.e. the second transparent conductive layer) is disposed between the third insulating layer 28 and the second insulating layer 25 and the other of the transparent conductive layer 29 (i.e. the first transparent conductive layer) and the transparent conductive layer 27 (i.e. the second transparent conductive layer) is disposed on the third insulating layer 28.

As shown in FIG. 3A to FIG. 5, in a pixel unit, in addition to the first contact via 231 which is corresponding to the first common pad 14a (and the second metal layer 24 it comprises), it is necessary to dispose a third contact via 281 which can electrically connect the transparent conductive layer 29 (i.e. the first transparent conductive layer) with the transparent conductive layer 27 (i.e. the second transparent conductive layer). The first contact via 231 and the third contact via 281 both are disposed on the first common line 13a and offset from each other.

Figure 6:
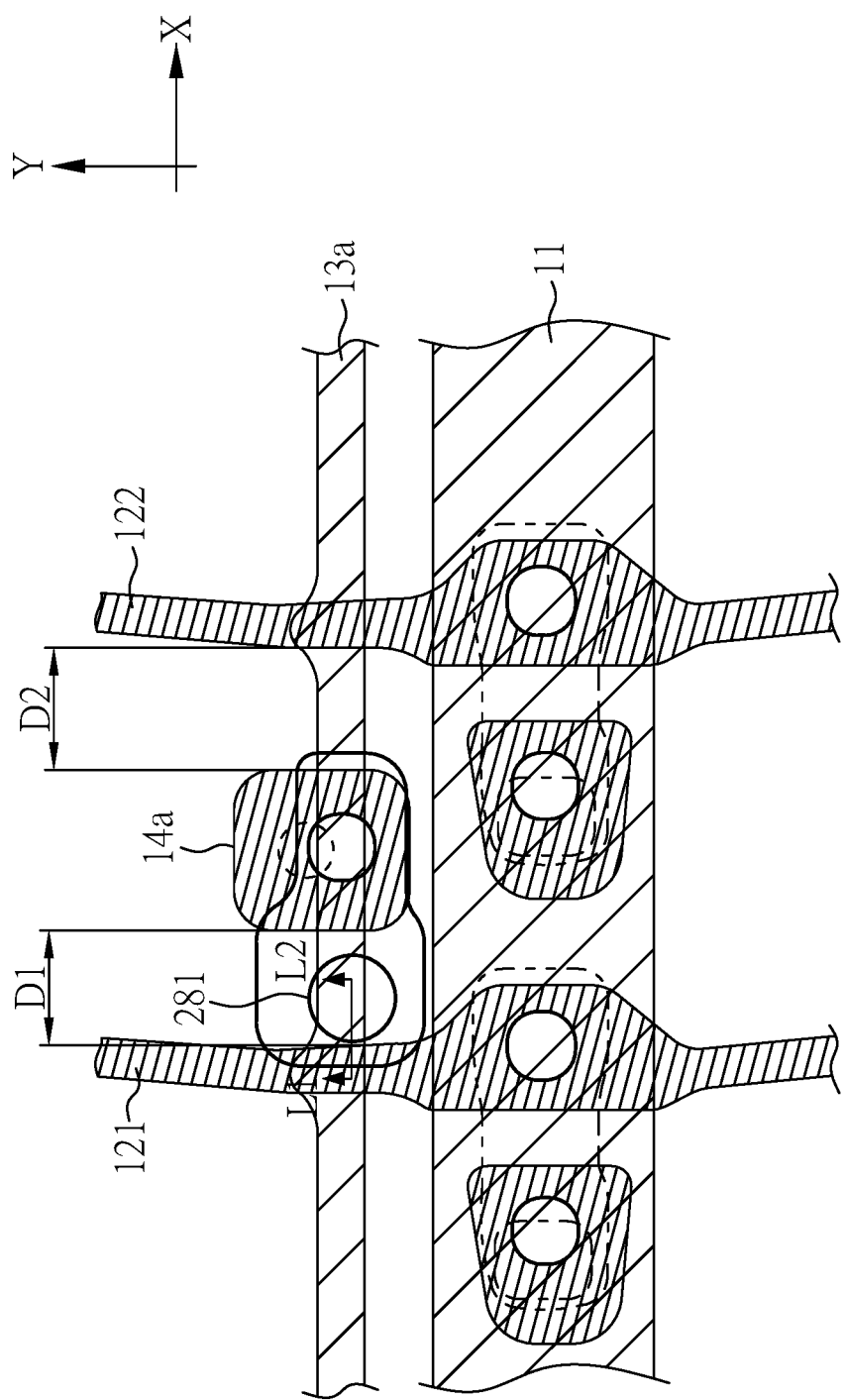
FIG. 6 is a magnified view of a portion of a thin film transistor substrate of a display panel according to one comparative example of the present disclosure.
Figure 7:
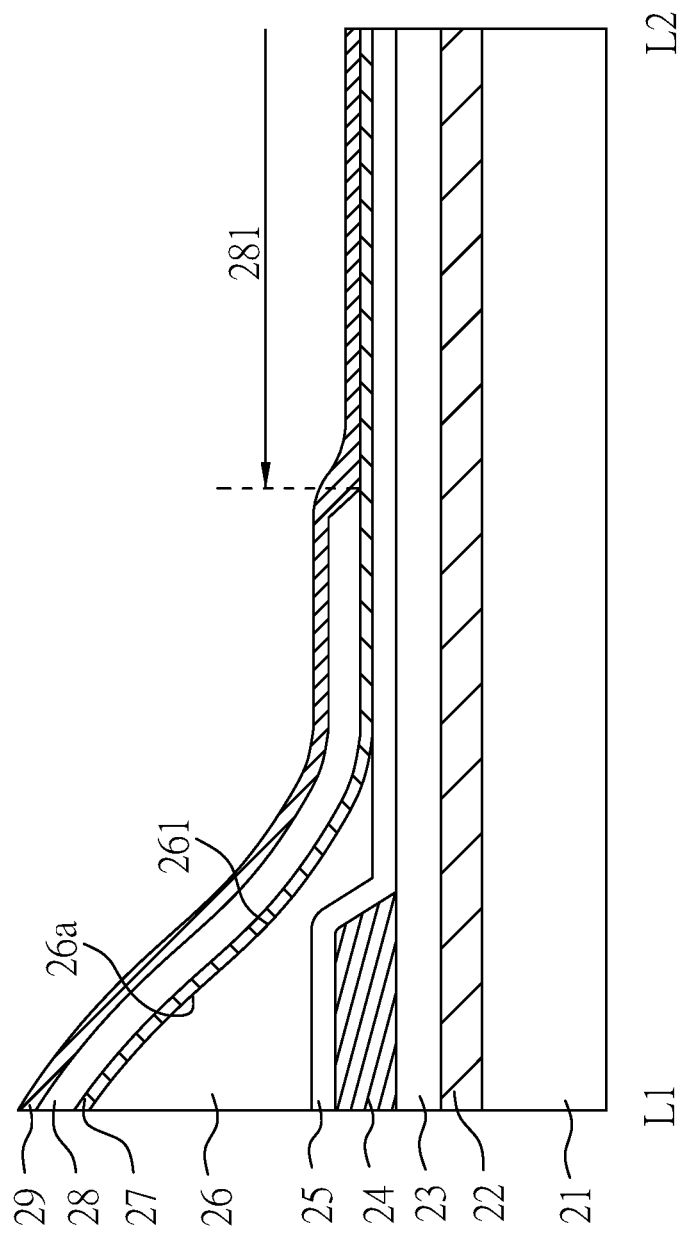
FIG. 7 is a cross-sectional view of a portion of a thin film transistor substrate of a display panel according to one comparative example of the present disclosure.

FIG. 6 is a magnified view of a portion of a thin film transistor substrate of a display panel according to one comparative example of the present disclosure. FIG. 6 and FIG. 3A of one embodiment of the present disclosure are the same view. FIG. 7 is a cross-sectional view along the line L1-L2 in FIG. 6. FIG. 7 and FIG. 4 of one embodiment of the present disclosure are the same view. However, for showing the relative positions of various layers on the substrate in details, only part of vias is shown in FIGS. 4 to 7. As shown in FIG. 6, when the first common pad 14a is disposed in the middle point between the first data line 121 and the second data line 122 which are adjacent to the first common pad 14a, i.e. the first minimum distance D1 between the first common pad 14a and the first data line 121 adjacent thereto and the second minimum distance D2 between the first common pad 14a and the second data line 122 adjacent thereto are designed to be equal, the third contact via 281 is much closer to the first data line 121. As shown in FIG. 6 and FIG. 7, there is an insulating layer 26 separating the first data line 121 (the second metal layer 24) and the transparent conductive layer 27 (i.e. the second transparent conductive layer). It is known that the sidewall 26a of the contact via of the insulating layer 26 is a declined side wall. When the third contact via 281 is closer to the first data line 121 (the second metal layer 24), the side wall 26a of the contact via of the insulating layer 26 locates above the first data line 121 (the second metal layer 24). The insulating layer 26 used to separate the first data line 121 (the second metal layer 24) and the transparent conductive layer 27 (i.e. the second transparent conductive layer) at the side wall 26a has a smaller thickness. Specifically, if the width of the pixel units along the extension direction X of the scan lines 11 becomes smaller while the size of the first common pad 14a remains, the contact via 261 of the insulating layer 26 possibly directly locates above the first data line 121 (the second metal layer 24). Hence, part of the first data line 121 (the second metal layer 24) is separated from the transparent conductive layer 27 (i.e. the second transparent conductive layer) only by the second insulating layer 25. Thus, in the present comparative example, the insulation of the insulating layer 26 between the transparent conductive layer 27 (i.e. the second transparent conductive layer) and the first data line 121 (the second metal layer 24) is poor, and the issue of unexpected large parasitic capacitance may occur.

In contrast, in the embodiment of the present disclosure, as shown in FIG. 3B and FIG. 4, the first minimum distance D1 between the first common pad 14a and the first data line 121 which is adjacent thereto and the second minimum distance D2 between the first common pad 14a and the second data line 122 which is adjacent thereto are different. Specifically, when the first minimum distance D1 is larger than the second minimum distance D2, the third contact via 281 is farther from the first data line 121 (the second metal layer 24). Hence, the previously described issue of poor insulation caused by the thinner insulating layer 26 at the side wall 26a of the contact via of the insulating layer 26 between the transparent conductive layer 27 (i.e. the second transparent conductive layer) and the first data line 121 (the second metal layer 24) can be avoided. And the parasitic capacitance arose between the transparent conductive layer 27 (i.e. the second transparent conductive layer) and the first data line 121 (the second metal layer 24) is further reduced.

As shown in FIG. 3B, the first minimum distance D1 and the second minimum distance D2 are related to the width of the first data line 121, the width of the second data line 122 and the width of the first common pad 14a along the extension direction X of the scan lines 11, and are further related to the location of the third contact via 281 and the diameter of the third contact via 281 along the extension direction X of the scan lines 11. In one embodiment, along the extension direction X of the scan lines 11, the distance W1 between the third contact via 281 and the first data line 121 is at least 1 µm or above; the diameter W2 of the third contact via 281 is at least 1.5 µm or above; the distance W3 between the third contact via 281 and the first common pad 14a is at least 2 µm or above; the width W4 of the first common pad 14a is at least 3.5 μm or above; the distance W5 between the first common pad 14a and the second data line 122 is at least 2 μm or above; the width W6 of the first data line 121 and the second data line 122 is at least 2 μm or above; and the width W of the pixel unit is the sum of W1, W2, W3, W4, W5 and W6. Therefore, in the present embodiment, the upper limit and the lower limit of the first minimum distance D1 are represented by the following equation (1) and equation (2), and the second minimum distance D2 is equal to the width W5.

The lower limit of the first minimum distance
$$D1=W1+W2+W3 \quad (1)$$

The upper limit of the first minimum distance
$$D1=W-W6-W5-W4 \quad (2)$$

For example, when the width W of the pixel unit along the extension direction X of the scan lines 11 is 309 μm, the difference between the first minimum distance D1 and the second minimum distance D2 is 1.5~299 μm; when the width W of the pixel unit along the extension direction X of the scan lines 11 is 206 μm, the difference between the first minimum distance D1 and the second minimum distance D2 is 1.5~196.17 μm; when the width W of the pixel unit is 155 μm, the difference between the first minimum distance D1 and the second minimum distance D2 is 1.5~144.75 μm; when the width W of the pixel unit is 103 μm, the difference between the first minimum distance D1 and the second minimum distance D2 is 1.5~93.33 μm; under the consideration of the manufacturing process variability, when the width W of the pixel unit along the extension direction X of the scan lines 11 is 300~320 μm, the difference between the first minimum distance D1 and the second minimum distance D2 is 1.5~299 μm; when the width W of the pixel unit is 200~220 μm, the difference between the first minimum distance D1 and the second minimum distance D2 is 1.5~196.17 μm; when the width W of the pixel unit is 145~165 μm, the difference between the first minimum distance D1 and the second minimum distance D2 is 1.5~144.75 μm; when the width W of the pixel unit is 100~120 μm, the difference between the first minimum distance D1 and the second minimum distance D2 is 1.5~93.33 μm.

The aforementioned width W, W1, W2, W3, W4, W5, W6 and the upper limit and the lower limit of the first minimum distance D1 are obtained according to the current patterning process and the electrical properties relationship between the required units; However, if the patterning process is improved or the electrical properties relationship between the required units are changed, the aforementioned width W, W1, W2, W3, W4, W5, W6, the upper limit and the lower limit of the first minimum distance D1 and the difference between the first minimum distance D1 and the second minimum distance D2 are not limited to the values disclosed in the present disclosure.

In addition, in one embodiment of the present disclosure, as shown in FIG. 2, the display panel of the present embodiment further comprises a second common pad 14b, a third common pad 14c, a second common line 13b and a third common line 13c. The structures of the second common pad 14b and the third common pad 14c are the same as that of the first common pad 14a; hence it is not repeated here. In addition, the second common line 13b and the third common line 13c are disposed on the display region AA (as shown in FIG. 1) and cross with the data lines 12, and the second common pad 14b and the third common pad 14c are disposed on the display region AA (as shown in FIG. 1) and electrically connect to the second common line 13b and the third common line 13c respectively; wherein the second common pad 14b is between the first common pad 14a and the third common pad 14c, a first distance S1 between the first common pad 14a and the second common pad 14b, a second distance S2 between the second common pad 14b and the third common pad 14c, and the first distance S1 is different from the second distance S2. At here, "a first distance S1 between the first common pad 14a and the second common pad 14b, a second distance S2 between the second common pad 14b and the third common pad 14c, and the first distance is different from the second distance" is defined as follows: when the scan line 11a is used as a baseline, the first common pad 14a, the second common pad 14b and the third common pad 14c are corresponding to positions C respectively on a scan line 11a along the direction Y which is perpendicular to the extension direction X of the scan lines 11, and the first distance S1 and the second distance S2 between adjacent C positions are different.

As mentioned above, in FIG. 3A to FIG. 5, when a common signal is provided, the signal is transmitted to the transparent conductive layer 27 (i.e. the second transparent conductive layer) through the first common pad 14a, the second common pad 14b and the third common pad 14c (the second metal layer 24 in FIG. 5) to homogenize the voltage in the entire surface of the transparent conductive layer 27 (i.e. the second transparent conductive layer); hence, in the present embodiment, as shown in FIG. 2, the distance between the first common pad 14a and the second common pad 14b adjacent to the first common pad 14a is designed to be different from the distance between the second common pad 14b and the third common pad 14c adjacent to the second common pad 14c to avoid the occurrence of visible ripple defects (mura).

In addition, in the present embodiment, as shown in FIG. 3A, the first common line 13a further comprises a protrusion 131 locating at the intersection of the first common line 13a and the first data line 121 and the intersection of the first common line 13a and the second data line 122. And the protrusion protrudes toward a lengthwise direction (direction Y) of the first data line 121 or the second data line 122. This design is used to increase the contact area between the first common line 13a and the first data line 121 and the contact area between the first common line 13a and the second data line 122. There are height differences at the intersection of the first common line 13a and the first data line 121 and at the intersection of the first common line 13a and the second data line 122 when the first data line 121 and the second data line 122 are formed because of the disposition of the first common line 13a. Therefore, when the first common line 13a comprises a protrusion 131 at the intersections, the protrusion 131 can increase the contact area between the first common line 13a and the first data line 121 and the contact area between the first common line 13a and the second data line 122 to reduce the risk of disconnection in the formation of the first data line 121 and the second data line 122. At the same time, the accumulation of etching solutions at the intersections can also be prevented. Thus the risk of disconnection of the first data line 121 and the second data line 122 is further reduced. As shown in FIG. 3A and FIG. 5, in the display panel of the present embodiment, the second contact via 251 partially overlaps with the first contact via 231; in other words, they are offset from each other. Particularly, in the cross-sectional view of FIG. 5, the edge 25a of the second contact via 251 exceeds the edge 22a of the first metal layer 22, that is, the edge 25a of the second contact via 251 locates outside of the first metal layer 22, and the edge 22a of the first metal layer 22 overlaps the second contact via 251. In this case, as shown in the dotted circle in FIG. 5, the second metal layer 24 which is formed on the first metal layer 22 has a height difference due to the edge 22a of the first metal layer 22. Hence, the surface area of the second metal layer 24 is increased. Consequently, when the transparent conductive layer 29 (i.e. the first transparent conductive layer) is formed on the second metal layer 24, the contact area between the transparent conductive layer 29 (i.e. the first transparent conductive layer) and the second metal layer 24 is increased due to the increase in the surface area of the second metal layer 24.

Additionally, as shown in FIG. 5, in the display panel of the present embodiment, an angle θ between the first metal layer 22 and the second metal layer 24 is larger than 0° and smaller than 45° (0°<θ<45°) at the place of the first contact via 231. In general, the first insulating layer 23 is made of a double-layer insulating material; the lower layer is silicon nitride layer and the upper layer is silicon oxide layer. Undercut is easy to occur when the first insulating layer 23 is patterned to form a first contact via 231 because the etching rate for the silicon nitride layer is larger. The undercut may affect the contact efficiency between the second metal layer 24 and the first metal layer 22 formed later on. Therefore, in the present embodiment, parameters of etching such as etching time, components of the etching solution and methods of etching are adjusted to control the slope of the first contact via 231 of the first insulating layer 23 to make the angle θ between the first metal layer 22 and the second metal layer 24 larger than 0° and smaller than 45°. Thus, the risk of undercut to occur is reduced, and the first metal layer 22 can contact better with the second metal layer 24, and the risk of disconnection of the transparent conductive layer 29 (i.e. the first transparent conductive layer) because the slope of the first contact via 231 is too large can also be prevented.

In the present disclosure, the display panels made in the aforesaid embodiments can be applied to liquid crystal display panels, organic light-emitting diode display panels, or inorganic light-emitting diode display panels. In addition, the display panels made in the aforesaid embodiments can be used along with touch panels as touch display devices. At the same time, the display panels or the touch display devices made in the aforesaid embodiments can be used in any electronic devices displaying images, such as monitors, mobile phones, laptop computers, video cameras, cameras, music players, mobile navigation systems, and televisions.

Although the present disclosure has been explained in relation to its examples, it is to be understood that many other possible modifications and variations can be made without departing from the spirit and scope of the disclosure as hereinafter claimed.

What is claimed is:

1. A display panel, comprising:
  a substrate comprising a display region and a border region;
  plural scan lines disposed on the display region;
  plural data lines disposed on the display region and crossing the plural scan lines;
  a first common line disposed adjacent to one of the plural scan lines and crossing the plural data lines;
  a first common pad contacting with the first common line through a first contact via;
  a transparent conductive layer contacting with the first common pad through a second contact via;
  the first common line disposed on the display region and comprising part of a first metal layer, and the first common pad comprising part of a second metal layer;
  a first insulating layer disposed between the first metal layer and the second metal layer, and the first insulating layer comprising the first contact via;
  a second insulating layer disposed on the second metal layer, and the second insulating layer comprising the second contact via; and
  a third insulating layer and a common electrode layer, wherein the third insulating layer is disposed on the second insulating layer and comprises a third contact via, the common electrode layer is disposed between the third insulating layer and the second insulating layer, the third insulating layer is disposed between the transparent conductive layer and the common electrode layer, the transparent conductive layer contacts with the common electrode layer through the third contact via, and each of the first contact via, the second contact via and the third contact via is overlapped with the first common line in a vertical direction perpendicular to a surface of the substrate.

2. The display panel as claimed in claim 1, wherein the first common line comprises a protrusion locating at an intersection of the first common line and one of the data lines and the protrusion protrudes toward a lengthwise direction of the data lines.

3. The display panel as claimed in claim 1, wherein, an angle between the first metal layer and the second metal layer is larger than 0° and smaller than 45° at the place of the first contact via.

4. The display panel as claimed in claim 1, wherein the first common pad comprises a first edge and a second edge and the first edge opposites to the second edge, the data lines comprise a first data line and a second data line adjacent to the first data line, the first data line is relatively close to the first edge and the second data line is relatively close to the second edge; wherein a first minimum distance is between the first data line and the first edge along a direction and a second minimum distance is between the second data line and the second edge along the direction, and the width of a pixel unit along the direction is 300 to 320 μm, a difference between the first minimum distance and the second minimum distance is 1.5 to 299 μm.

5. The display panel as claimed in claim 4, wherein the first common pad further comprises a third edge, and two ends of the third edge intersect with the first edge and the second edge respectively; wherein, the third edge is substantially parallel to the direction.

6. The display panel as claimed in claim 1, wherein the first common pad comprises a first edge and a second edge, the first edge opposites to the second edge, the data lines comprise a first data line and a second data line adjacent to the first data line, the first data line is relatively close to the first edge and the second data line is relatively close to the second edge; wherein a first minimum distance is between the first data line and the first edge along a direction and a second minimum distance is between the second data line and the second edge along the direction, and the width of a pixel unit along the direction is 200 to 220 μm, a difference between the first minimum distance and the second minimum distance is 1.5 to 196.17 μm.

7. The display panel as claimed in claim 6, wherein the first common pad further comprises a third edge, and two ends of the third edge intersect with the first edge and the second edge respectively; wherein, the third edge is substantially parallel to the direction.

8. The display panel as claimed in claim 1, wherein the first common pad comprises a first edge and a second edge, the first edge opposites to the second edge, the data lines comprise a first data line and a second data line adjacent to the first data line, the first data line is relatively close to the first edge and the second data line is relatively close to the second edge; wherein a first minimum distance is between the first data line and the first edge along a direction and a second minimum distance is between the second data line and the second edge along the direction, and the width of a pixel unit along the direction is 145 to 165 μm, a difference between the first minimum distance and the second minimum distance is 1.5 to 144.75 μm.

9. The display panel as claimed in claim 8, wherein the first common pad further comprises a third edge, and two ends of the third edge intersect with the first edge and the second edge respectively; wherein, the third edge is substantially parallel to the direction.

10. The display panel as claimed in claim 1, wherein the first common pad comprises a first edge and a second edge and the first edge opposites to the second edge, the data lines comprise a first data line and a second data line adjacent to the first data line, the first data line is relatively close to the first edge and the second data line is relatively close to the second edge; wherein a first minimum distance is between the first data line and the first edge along a direction and a second minimum distance is between the second data line and the second edge along the direction, and the width of a pixel unit along the direction is 100 to 120 μm, a difference between the first minimum distance and the second minimum distance is 1.5 to 93.33 μm.

11. The display panel as claimed in claim 10, wherein the first common pad further comprises a third edge, and two ends of the third edge intersect with the first edge and the second edge respectively; wherein, the third edge is substantially parallel to the direction.

12. The display panel as claimed in claim 1, wherein an edge of the first metal layer overlaps the second contact via.

13. The display panel as claimed in claim 1, further comprising a second common line, a third common line, a second common pad, and a third common pad, wherein the first common line, the second common line, and the third common line are disposed on the display region, the first common line, the second common line, and the third common line cross the data lines, and the second common pad and the third common pad is electrically connected to the second common line and the third common line respectively.

14. A touch display device, comprising:
a substrate comprising a display region and a border region;
plural scan lines disposed on the display region;
plural data lines disposed on the display region and crossing the plural scan lines;
a first common line disposed adjacent to one of the plural scan lines and crossing the plural data lines;
a first common pad contacting with the first common line through a first contact via;
a transparent conductive layer contacting with the first common pad through a second contact via;
the first common line disposed on the display region and comprising part of a first metal layer, and the first common pad comprising part of a second metal layer;
a first insulating layer disposed between the first metal layer and the second metal layer, and the first insulating layer comprising the first contact via;
a second insulating layer disposed on the second metal layer, and the second insulating layer comprising the second contact via; and
a third insulating layer and a common electrode layer, wherein the third insulating layer is disposed on the second insulating layer and comprising a third contact via, the common electrode layer is disposed between the third insulating layer and the second insulating layer, the third insulating layer is disposed between the transparent conductive layer and the common electrode layer, the transparent conductive layer contacts with the common electrode layer through the third contact via, and each of the first contact via, the second contact via and the third contact via is overlapped with the first common line in a vertical direction perpendicular to a surface of the substrate.

15. The touch display device as claimed in claim 14, wherein the first common line comprises a protrusion locating at an intersection of the first common line and one of the data lines and the protrusion protrudes toward a lengthwise direction of the data lines.

\* \* \* \* \*